US012587277B2

(12) United States Patent
Bjørnstad

(10) Patent No.: US 12,587,277 B2
(45) Date of Patent: Mar. 24, 2026

(54) LOCATING DISTURBANCES IN OPTICAL FIBRES

(71) Applicant: Tampnet AS, Stavanger (NO)

(72) Inventor: Steinar Bjørnstad, Stavanger (NO)

(73) Assignee: Tampnet AS, Stavanger (NO)

( * ) Notice: Subject to any disclaimer, the term of this patent is extended or adjusted under 35 U.S.C. 154(b) by 237 days.

(21) Appl. No.: 18/280,179

(22) PCT Filed: Mar. 4, 2022

(86) PCT No.: PCT/GB2022/050581
§ 371 (c)(1),
(2) Date: Sep. 1, 2023

(87) PCT Pub. No.: WO2022/185075
PCT Pub. Date: Sep. 9, 2022

(65) Prior Publication Data
US 2024/0072891 A1 Feb. 29, 2024

(30) Foreign Application Priority Data

Mar. 5, 2021 (GB) ...................................... 2103103

(51) Int. Cl.
*H04B 10/079* (2013.01)
(52) U.S. Cl.
CPC ................................ *H04B 10/0791* (2013.01)
(58) Field of Classification Search
CPC ............................................... H04B 10/0791
(Continued)

(56) References Cited

U.S. PATENT DOCUMENTS 7,885,539 B2 * 2/2011 Leppla ................ H04J 14/0305
398/13
7,903,977 B2 3/2011 MacDonald et al.
(Continued)

FOREIGN PATENT DOCUMENTS

JP H 01-218139 A 8/1989
JP H 07-83792 A 3/1995
(Continued)

OTHER PUBLICATIONS

Barcik et al., "Measurement of slow and fast polarization transients on a fiber-optic testbed," Optics Express, vol. 28, No. 10, May 11, 2020, 8 pages.
(Continued)

*Primary Examiner* — Quan Zhen Wang
(74) *Attorney, Agent, or Firm* — Klarquist Sparkman, LLP

(57) ABSTRACT

An apparatus for determining a position of a disturbance to an optical fibre assembly comprises two monitoring units each comprising a respective light detector and a respective clock. The first monitoring unit receives a first digital optical signal from the optical fibre assembly. The second monitoring unit receives a second digital optical signal from the optical fibre assembly. The apparatus monitors the state of polarisation of the first and second digital optical signals and determines respective times at which a change occurs in the state of polarisation of each signal, the change arising from a disturbance to the optical fibre assembly. The apparatus uses said times to determine a position of the disturbance.

24 Claims, 3 Drawing Sheets

(58) Field of Classification Search
USPC .......................................................... 398/13
See application file for complete search history.

(56) References Cited

U.S. PATENT DOCUMENTS

| | | | |
|---|---|---|---|
| 8,736,826 B2 | 5/2014 | Lovely et al. | |
| 9,379,771 B2 | 6/2016 | Fludger | |
| 9,680,567 B2 * | 6/2017 | Swanson | H04L 43/0852 |
| 2003/0072060 A1 * | 4/2003 | Sourani | H04B 10/60 |
| | | | 398/121 |
| 2007/0253662 A1 | 11/2007 | Patel et al. | |
| 2007/0274712 A1 * | 11/2007 | Leppla | H04B 10/0791 |
| | | | 398/20 |
| 2008/0232795 A1 | 9/2008 | Klar et al. | |
| 2009/0135428 A1 * | 5/2009 | Healey | G01H 9/004 |
| | | | 356/477 |
| 2010/0277719 A1 * | 11/2010 | Chen | G08B 13/186 |
| | | | 356/73.1 |
| 2012/0224846 A1 * | 9/2012 | Swanson | H04B 10/85 |
| | | | 398/13 |
| 2014/0376905 A1 * | 12/2014 | Fludger | H04B 10/073 |
| | | | 398/13 |
| 2019/0120663 A1 | 4/2019 | Suzaki | |
| 2019/0280942 A1 | 9/2019 | Côté et al. | |
| 2019/0379589 A1 | 12/2019 | Ryan et al. | |

FOREIGN PATENT DOCUMENTS

| | | | |
|---|---|---|---|
| JP | 2000-48269 A | 2/2000 | |
| KR | 101072747 B1 | 10/2011 | |
| WO | WO 2022/185074 A1 | 9/2022 | |
| WO | WO 2022/185075 A1 | 9/2022 | |

OTHER PUBLICATIONS

Calnex Solutions Ltd., "Implementing IEEE 1588v2 for use in the mobile backhaul," Technical Brief, © 2019, 24 pages.
"Charlton et al., ""Field measurements of SOP transients in OPGW, with time and location correlation to lightning strikes,"" Optics Express, vol. 25, No. 9, May 1, 2017, 8 pages."
Dou et al., "Distributed Acoustic Sensing for Seismic Monitoring of The Near Surface: A Traffic-Noise Interferometry Case Study," Scientific Reports, Sep. 14, 2017, 12 pages.

Eidson, Agilent Technologies, "IEEE-1588 Standard for a Precision Clock Synchronization Protocol for Networked Measurement and Control Systems," Oct. 10, 2005, 94 pages.
Fernando, "Two methods measure chromatic dispersion," edn.com/two-methods-measure-chromatic-dispersion/, Mar. 1, 2022, 7 pages.
International Search Report and Written Opinion for PCT/GB2022/050580, Mailed Jul. 1, 2022, 21 pages.
International Search Report and Written Opinion for PCT/GB2022/050581, Mailed Jul. 5, 2022, 19 pages.
Kamalov et al., "What's shaking? Earthquake detection with submarine cables," Google Cloud Blog, Jul. 16, 2020, 6 pages.
"Linze et al., ""Development of an Intrusion Sensor Based on a Polarization-OTDR System,"" IEEE Sensors Journal, vol. 12, No. 10, Oct. 2012, pp. 3005-3009."
Marra et al., "Ultrastable laser interferometry for earthquake detection with terrestrial and submarine cables," Science 361, Aug. 3, 2018, pp. 486-490.
Pietralunga et al., Fast Polarization Effects in Optical Aerial Cables Caused by Lightning and Impulse Current, IEEE Photonics Technology Letters, vol. 16, No. 11, Nov. 2004, pp. 2583-2585.
Shaik, "EDFA (Erbium Doped Fiber Amplifier)," Physics and Radio-Electronics, downloaded from https://www.physics-and-radio-electronics.com/blog/edfa-erbium-doped-fiber-amplifier, 12 pages.
"SAKOLOV, ""Particularities of Polarization-Mode Dispersion in optical fiber with Wavelength Division Multiplexing during the Lightning stroke,"" 2007 International Symposium on Electromagnetic Compatibility, Oct. 2007, pp. 448-450."
"Šlapák et al., ""Polarization Changes as Early Warning System in Optical Fiber Networks,"" 2019 42nd International Conference on Telecommunications and Signal Processing (TSP)," Jul. 2019, 5 pages.
Wu et al., "Multi-Point Disturbance Detection and High-Precision Positioning of Polarization-Sensitive Optical Time-Domain Reflectometry," Journal of Lightwave Technology, vol. 34, No. 23, Dec. 1, 2016, pp. 5371-5377.
Wu et al., "Multi-point Detection for Polarization-sensitive Optical Time Domain Reflectometry and Its Applications in Electric Power Industry," 2016 Progress In Electromagnetic Research Symposium (PIERS), Aug. 8-11, 2016, pp. 4912-4918.
"Wuttke et al., Polarization Oscillations in Aerial Fiber Caused by Wind and Power-Line Current," IEEE Photonics Technology Letters, vol. 15, No. 6, Jun. 2003, pp. 882-884.

* cited by examiner

LOCATING DISTURBANCES IN OPTICAL FIBRES

CROSS REFERENCE TO RELATED APPLICATIONS

This is the U.S. National Stage of International Application No. PCT/GB2022/050581, filed Mar. 4, 2022, which was published in English under PCT Article 21(2), which in turn claims the benefit of Great Britain Application No. 2103103.4, filed Mar. 5, 2021.

BACKGROUND OF THE INVENTION

The present invention relates to apparatus and methods for determining the position of a disturbance in an optical fibre.

Modern society is increasingly reliant on electronic communication and data-transport infrastructure. Current telecommunication cable networks span distances which range from a few hundred meters to thousands of kilometres, with sub-sea cables extending along the ocean floor to allow signals to be exchanged between parties in different countries and continents, or between land-based and off-shore installations.

Optical fibre networks have become increasingly popular owing to the speed and reliability of communications that they can deliver. As a result of this widespread dependence on electronic communication technology, it has become important to ensure that this infrastructure is constantly available and performs reliably. Consequently, any potential weaknesses or failures in such communication networks, such as disturbances or breakages in a communications cable, must be detected and resolved as quickly as possible in order to prevent the loss of data or a breakdown in communication.

In some cases, it may be sufficient to detect simply that a disturbance or breakage has occurred, and to determine the location of the fault by physically inspecting the length of the cable. However, in the case of long-distance communication, it is desirable to be able to determine accurately the location of a fault without requiring a time-consuming and expensive inspection of the entire cable.

Although techniques have been developed for estimating the position of a disturbance in an optical fibre cable, these are often not applicable to optical fibre cables of the lengths typically used in the communications industry. Some such techniques involve the use of an Optical Time Domain Reflectometer (OTDR) to perform Distributed Acoustic Sensing (DAS). In this method, light pulses are transmitted into an optical fibre and measurements are taken of backscattered Rayleigh reflections. Using a narrowband coherent laser as a transmitting source allows a comparison of the phase of the received signal to be compared with the phase of the transmitted signal. Changes in the optical path of the optical fibre, caused by physical disturbances to the fibre, can thus be detected.

However, such techniques are not well suited for optical fibre communication systems spanning distances beyond 100 km. Network elements comprising signal amplifiers are typically required to be distributed along longer cables in order to compensate for attenuation of the signal in the optical fibres. These network elements may be electro-optical, converting the optical signal to an electrical signal in order to regenerate the signal before it is converted back to an optical signal. In this case, the incoming optical signal is terminated at the input of the network element, thus preventing any OTDR measurements beyond the termination point. If the network elements comprise optical amplifiers, such as Erbium Doped Fibre Amplifiers (EDFA) or Raman amplifiers, then optical isolators are typically used to prevent light from being reflected back towards the transmitter. Again, as a result, OTDRs cannot be used to determine the location of a disturbance, as backscattered reflections cannot be detected.

Thus, there is a need for apparatus and methods for determining a location of a disturbance to an optical fibre that overcome these shortcomings.

SUMMARY OF THE INVENTION

When viewed from a first aspect, the invention provides an apparatus for determining a position of a disturbance to an optical fibre assembly, the apparatus comprising:
  a first monitoring unit, comprising a first light detector and a first clock;
  a second monitoring unit, comprising a second light detector and a second clock; and
  a processing system,
wherein the apparatus is configured to:
  receive, at the first monitoring unit, a first digital optical signal from an optical fibre assembly;
  receive, at the second monitoring unit, a second digital optical signal from the optical fibre assembly;
  monitor a state of polarisation of the first digital optical signal received at the first light detector;
  determine, using the first clock, first data representative of a first time, being a time at which a change occurs in the state of polarisation of the first digital optical signal received at the first light detector, the change arising from a disturbance to the optical fibre assembly;
  monitor a state of polarisation of the second digital optical signal received at the second light detector;
  determine, using the second clock, second data representative of a second time, being a time at which a change occurs in the state of polarisation of the second digital optical signal received at the second light detector, the change arising from the disturbance; and
  process the first data and the second data to determine a position of the disturbance.
When viewed from a second aspect, the invention provides a method of determining a position of a disturbance to an optical fibre assembly that is optically coupled to a first monitoring unit and to a second monitoring unit, the method comprising:
  receiving, at the first monitoring unit, a first digital optical signal carried by the optical fibre assembly;
  monitoring a state of polarisation of the first digital optical signal received at the first monitoring unit;
  receiving, at the second monitoring unit, a second digital optical signal carried by the optical fibre assembly;
  monitoring a state of polarisation of the second digital optical signal received at the second monitoring unit;
  determining, using a first clock, first data representative of a first time, being a time at which a change occurs in the state of polarisation of the first digital optical signal received at the first monitoring unit, the change arising from a disturbance to the optical fibre assembly;
  determining, using a second clock, second data representative of a second time, being a time at which a change occurs in the state of polarisation of the second digital optical signal received at the second monitoring unit, the change arising from the disturbance; and processing the first data and the second data to determine a position of the disturbance.

When viewed from a third aspect, the invention provides a monitoring unit for use in a method of determining a position of a disturbance to an optical fibre assembly, the monitoring unit comprising a light detector and a clock, and being configured to:

receive a digital optical signal from an optical fibre assembly;

monitor a state of polarisation of the digital optical signal received at the light detector; and determine, using the clock, data representative of a time at which a change occurs in the state of polarisation of the digital optical signal received at the light detector, the change arising from a disturbance to the optical fibre assembly and the data being suitable for processing to determine a position of the disturbance.

In a first set of embodiments, the monitoring unit may be configured to send the data to a remote processing system (e.g. to a networked server, over a radio or cabled communications interface). The remote processing system may be configured to receive second data from a second monitoring unit, representative of a second time, being a time at which a change occurs in the state of polarisation of a second digital optical signal received from the optical fibre assembly at a light detector of the second monitoring unit, the change arising from the same disturbance to the optical fibre assembly. It may be configured to process the data and the second data to determine a position of the disturbance. The monitoring unit and remote processing system may together provide apparatus according to a further aspect of the invention.

In a second set of embodiments, the monitoring unit may comprise a local processing system (e.g. comprising a processor and memory storing software for execution by the processor), which may be configured to receive, from a second monitoring unit (e.g. over a radio or cabled communications interface), second data representative of a second time, being a time at which a change occurs in the state of polarisation of a second digital optical signal received from the optical fibre assembly at a light detector of a second monitoring unit, the change arising from the same disturbance to the optical fibre assembly. The monitoring unit may be configured to process the data and the second data to determine a position of the disturbance.

Thus it will be appreciated that embodiments of the present invention determine a position at which a disturbance to an optical fibre assembly has occurred from the respective times (determined using two different clocks) at which the same disturbance is detected at two different points coupled to the fibre assembly, by monitoring for resulting changes in polarisation. The respective monitoring might be performed at opposite ends of fibre assembly in some embodiments, although this is not essential.

The disturbance may be a physical disturbance, such as a displacement or vibration of the optical fibre assembly, or a non-physical disturbance that influences the transmission of light through the optical fibre assembly, such as a changing electromagnetic field. It may be caused by physical contact (e.g. impact), which may be an impact caused by a vehicle, such as impact by a boat or by fishing tackle fastened to a boat; or may be caused by acoustic waves, electromagnetic interference from an electromagnetic field (e.g. caused by a lightning strike or by a switching of current direction in a nearby power cable), or any other means. The applicant has determined that monitoring for changes in the state of polarisation (SOP) can enable particularly sensitive detection, and accurate localisation, of disturbances along fibre optic cables.

The first and second digital optical signals may comprise telecommunication signals. The first digital optical signal may comprise a first stream (i.e. succession) of data packets. The second digital optical signal may comprise a second stream of data packets. The detector system may comprise a demodulator for demodulating the first and second digital optical signals.

The optical fibre assembly may, in some embodiments, form part of the apparatus. The optical fibre assembly may comprise an optical fibre carrying both the first and second digital optical signals in opposite directions (e.g. on carriers of different wavelengths). However, in some embodiments, the optical fibre assembly comprises a pair of optical fibres. The optical fibre pair may comprise a first optical fibre arranged to carry the first digital optical signal past the disturbance to the first monitoring unit. The optical fibre pair may comprise a second optical fibre arranged to carry the second digital optical signal past the disturbance to the second monitoring unit.

Preferably, the optical fibre assembly is arranged to extend between the first monitoring unit and the second monitoring unit so as to allow bi-directional optical communication between the two monitoring units. The monitoring units may be at respective ends (i.e. terminuses) of the fibre assembly. The first monitoring unit may comprise a first optical transmitter and the second monitoring unit may comprise a second optical transmitter. Thus, the first and second monitoring units may comprise respective first and second optical transmitter-receiver pairs. The first transmitter may be arranged to transmit the second digital optical signal from the first monitoring unit (past the disturbance) to the second monitoring unit. The second transmitter may be arranged to transmit the first digital optical signal from the second monitoring unit (past the disturbance) to the first monitoring unit. The transmitters and/or receivers in the monitoring units may be arranged to convert the signals between optical signals and electrical signals.

However, it will be appreciated that the first and second digital optical signals need not necessarily be transmitted from the first and second monitoring units. Instead, the first and/or second monitoring units may be arranged to receive the second and/or first digital optical signal respectively—e.g. to act as relays or passive monitoring devices. The first and/or second digital optical signals may be transmitted to the second and/or first monitoring units respectively from one or two separate transmitters. Thus, in some embodiments, the optical fibre assembly may be arranged to carry digital optical signals from one or two separate transmitters, not associated with the first or second monitoring units.

In embodiments in which the optical fibre assembly comprises a pair of fibres for carrying the respective signals, the fibres of the optical fibre pair may be contained in respective optical fibre cables, e.g. laid parallel and in close proximity for at least a majority of their length. The optical fibre cables may be submarine cables. In some embodiments, the optical fibre cables are aerial cables, e.g. overhead lines suspended from pylons. The respective optical fibre cables may be touching or separated by an average or maximum of at most one, five or ten metres along a majority or all of their lengths between the first and second monitoring units. In this way, both fibres of the pair are likely to be sufficiently closely laid along at least a majority of their length that both experience the same disturbance.

Preferably, however, the fibres of the optical fibre pair are arranged within a single optical fibre cable—i.e. within a common housing or shield. Methods embodying the invention may be particularly effective in such situations, since this may increase the likelihood that a disturbance to one optical fibre will affect both optical fibres and, thus, the transmission of both the first digital optical signal and the second digital optical signal. The fibres of the optical fibre pair may be uni-directional, i.e. each arranged to carry digital optical signals in one respective direction only.

The optical fibre assembly may comprise a plurality of individual optical fibres. A high number of optical fibres (e.g. tens or hundreds) may be embedded within the same cable so as to provide a high availability of fibre connectivity. This can be beneficial for telecommunication systems, which may be used by a large number of customers.

In some embodiments, the apparatus is arranged for bi-directional communication over an optical fibre of the optical fibre assembly, i.e. arranged to communicate digital optical signals in two directions over a single optical fibre. The monitoring units may each comprise a respective optical transmitter and an optical receiver coupled to the bi-directional fibre. They may be configured to share the fibre through wavelength division multiplexing (WDM) or polarisation-division multiplexing (PDM). Bi-directional communication on a single fibre allows the total required number of optical fibres for installation to be reduced, which may be beneficial from a cost perspective. This is further helped by the reduction in auxiliary components such as fibre splices and amplifiers.

However, at least in some embodiments, the monitoring units do not share a single fibre using time-division multiplexing, since, in preferred embodiments, the monitoring units are configured to receive the first and second digital optical signals simultaneously, at least over some time periods. This helps to ensure reliable and timely detection of disturbances, by enabling there to be signals passing the site of any disturbance along the fibre(s), in opposite directions, at the same time. The first and second monitoring units may be configured to transmit the second and first digital optical signals continuously, at least for a time (e.g. for minutes, hours or days). They may be configured to output an optical signal (e.g. a succession of null packets), even when they have no message payload data to send.

The optical fibre assembly may comprise a plurality of optical fibre segments that are joined (e.g. spliced or coupled end-to-end) to form a longer single signal path or pair of paths. The apparatus may further comprise one or more optical amplifiers for amplifying the first and second digital optical signals. The optical amplifier(s) may be located along the optical fibre assembly. The optical amplifier(s) may comprise an Erbium Doped Fibre Amplifier (EDFA). The optical amplifiers may comprise Raman amplifiers, which can provide long-distance spans (e.g. 500 km) of optical fibre without intermediate amplification, or other suitable optical amplification technology, such as Semiconductor Optical Amplifiers (SOA).

Preferably the first and second monitoring units are arranged in separate housings. The first and second monitoring units are preferably in different locations, which may be spaced apart. They may be separated by ten, hundreds or thousands of kilometres.

Preferably the first clock is configured to output a first periodic clock signal and the second clock is configured to output a second periodic clock signal. Preferably the first periodic clock signal is used to clock (i.e. provide a clock signal to) at least some of the components of the first monitoring unit (e.g. a first digital sampling unit). Preferably the second periodic clock signal is used to clock at least some of the components of the second monitoring unit (e.g. a second digital sampling unit). Preferably, one or both of the monitoring units comprises circuitry for synchronising the first clock and the second clock, e.g. as disclosed in more detail below.

The first and/or second monitoring units preferably comprise a first and/or a second light detector, respectively, for receiving the first and/or second digital optical signals. The first and/or second light detectors may each comprise one or more electro-optical sensors (e.g. photodiodes) for converting optical signals into electrical signals. The first and/or second light detectors may each further comprise a demodulator for demodulating the received optical signals. The first and/or the second light detectors may each comprise a coherent or non-coherent receiver. In embodiments comprising a coherent receiver, the coherent receiver may be configured to measure one or more physical parameters, such as SOP and/or signal strength, of the received signal.

The first and/or second monitoring unit may each comprise a respective optical transmitter (e.g. a laser diode) for converting an electrical signal into an optical signal (e.g. the second and/or first digital signals). Each transmitter may comprise a modulator for modulating the optical signal.

The first and second monitoring units (optionally in combination with a remote processing system) may comprise an optical analysis system arranged to monitor the state of polarisation (SOP) of the first and second digital optical signals. The optical analysis system may comprise a first optical analysis component located in the first monitoring unit and a second optical analysis component located in the second monitoring unit. In embodiments in which the first light detector comprises a first coherent receiver, the first optical analysis component may be a component of the first coherent receiver. In embodiments in which the second light detector comprises a second coherent receiver, the second optical analysis component may be a component of the second coherent receiver. This can allow the monitoring components to form an integrated part of the digital optical signal transmission system.

The optical analysis system may comprise one or more filters for filtering out changes in SOP that occur at a frequency above a low-pass threshold (e.g. for removing polarisation modulation components). It may comprise one or more filters for filtering out change in SOP that occur at a frequency below a high-pass threshold (e.g. caused by slow-changing temperature fluctuations in the fibre). It may comprise low-pass filters, high-pass filters and/or band-pass filters.

When a physical disturbance is experienced by the optical fibre assembly, e.g. due to direct impact or due to sound waves, it is likely that a detectable change in the SOP of the digital optical signals will occur. Thus, by monitoring the SOP at the first and second monitoring units, the occurrence of a disturbance can be detected.

The apparatus (i.e. one or both monitoring units, optionally with an associated processing system) may be configured to monitor the SOP of the first and second signals over time. The apparatus may be configured to monitor the SOP continually—e.g. by sampling the SOP of each signal at regular intervals. The first monitoring unit may be configured to sample the SOP of the first optical signal according to the first clock. The first data may encode a time for each of a series of samples of the SOP of the second signal, determined using the first clock. The second monitoring unit may be configured to sample the SOP of the second optical signal according to the second clock. The second data may encode a time for each of a series of samples of the SOP of the first signal, determined using the second clock.

The apparatus may be configured to determine a SOP for each packet (or for a fragment of each packet) received at the first and second light detectors, potentially multiple times over the duration of each packet. The apparatus may be configured to determine a SOP for a subset or all of the packets received at the first and second light detectors over the fibre or fibres. The apparatus may be configured to monitor for changes in the SOP between two (e.g. immediately) successive packets, or within a single packet. The apparatus may be configured to monitor for a change in the SOP over a fixed time interval. In some embodiments, the apparatus (e.g. the processing system in particular) is configured to calculate a derivative of SOP with respect to time.

If a disturbance is experienced by the optical fibre assembly, it is possible that, as well as a change in SOP, a change in the amplitude (i.e. signal strength) and/or phase and/or signal-to-noise ratio (SNR) of the signals will occur, the timing of which may be indicative of the location of the disturbance along the fibre optic assembly. The disturbance may also then lead to a detectable change in a respective bit error ratio (BER) determined for each digital signal. The applicant has determined that, in general, monitoring changes in SOP is more sensitive to small disturbances than monitoring changes in amplitude and SNR, and is more straightforward to implement than monitoring changes in phase. For example, while even slight bending of an optical fibre cable may cause a detectable SOP change, a detectable change in amplitude might only occur when significant bending is experienced. Nevertheless, in some embodiments, the apparatus may be configured to monitor a further parameter of the first and second digital optical signals, received at the respective light detectors, in addition to monitoring SOP. This may be useful for increasing sensitivity or for discriminating between different types of disturbance. The further parameter may be amplitude, phase, signal-to-noise ratio (SNR), bit error ratio (BER), or a time derivative of any of these, or some other parameter or metric. The first and/or second monitoring units may be configured to generate analog or digital electrical signals representative of any one or more of a SOP, an amplitude, a phase, a SNR or a BER of the first and/or second digital optical signals respectively. SNR or BER may be determined by a demodulator or decoder of the monitoring unit that receives the respective signal. The apparatus may be configured to process data representative of the further parameter, for one or both of the first and second digital optical signals, when determining the position of the disturbance.

The processing system may be configured to compare changes in the SOP with changes in the further parameter. This may help to improve the reliability of a detection that a disturbance has taken place. It may also allow identification of the type of disturbance to be undertaken (e.g. using machine learning methods) based on the monitored values of the changes in parameters. In some embodiments, the processing system may be configured to use BER to distinguish between changes in SOP, amplitude or phase caused by a disturbance and changes due to modulation of the digital optical signals. This may improve sensitivity to disturbances such as lightning strikes that can produce frequency artefacts close to frequency components in the modulated signal (which could be components similar to the modulation rate, which might be tens or hundreds of GBaud, or which could be lower-frequency components of the signal).

The first optical analysis component may be configured to output a first monitoring signal that represents changes in the SOP for the first digital optical signal. The first data may comprise or be derived from some or all of the first monitoring signal. Preferably the first monitoring signal is time-stamped using the first periodic clock signal, generated by the first clock. A time-stamp may comprise any form of timing information associated with the signal—e.g., a Coordinated Universal Time (UTC) time value for each SOP sample, or a time series of regularly-spaced SOP samples, having a predetermined sampling period, in combination with a time value for one or more of the samples.

The second optical analysis component may be configured to output a second monitoring signal that represents changes in the SOP for the second digital optical signal. The second data may comprise or be derived from some or all of the second monitoring signal. The second monitoring signal may be time-stamped using the second periodic clock signal, generated by the second clock.

The first and the second optical analysis components may be configured to time-stamp the first and second monitoring signals respectively according to times that the first and second digital optical signals respectively arrive at the first and second monitoring units. This means that the respective times-of-arrival of changes in the SOP (e.g. that are indicative of a disturbance to the optical fibre assembly) at the first and second monitoring units can be determined. The first and second monitoring signals may be optical signals or electrical signals.

The processing system may be configured to determine, from the first data, a time (e.g. said first time), at which a change in the SOP of the first digital optical signal occurs that is indicative of the disturbance, or a possible disturbance, to the optical fibre assembly. This may comprise determining that a change in the SOP of the first digital optical signal meets a first criterion. It may comprise detecting when a change in SOP of the first digital optical signal exceeds a first threshold. Similarly, the processing system may be configured to determine, from the second data, a time (e.g. said second time), at which a change in the SOP of the second digital optical signal occurs that is indicative of the disturbance, or a possible disturbance, to the optical fibre assembly. This may comprise determining that a change in the parameter of the second optical signal meets a second criterion. Determining the second may comprise determining whether the change meets a second criterion. It may comprise detecting when a change in SOP of the second digital optical signal exceeds a second threshold. In some embodiments, the second criterion may be different to the first criterion. However, preferably the second criterion is the same as the first criterion. Thus, preferably the first threshold is equal to the second threshold. Preferably the processing system is configured to process the first data and the second data to determine a position of the disturbance in response to the processing system determining (and preferably only when the processing system determines) that the first data and the second data meet the first criterion and the second criterion respectively.

The first and/or second threshold may be set such that any change in the respective SOP meets the first and/or second criterion respectively. However, in preferred embodiments, the first and/or second thresholds are non-trivial or greater than zero; they may be set such that below-threshold changes in the SOP, e.g. resulting from noise in the signal that is unlikely to be caused by a disturbance of interest, do not meet the first and/or second criterions. This helps to ensure that only significant SOP changes, which are likely to have been caused by a disturbance to the optical fibre assembly, are processed to determine the position of a disturbance. This can make the processing more efficient and help to avoid spurious detections. The first and second criteria may be applied by respective components of the processing system that are located in the first and second monitoring units respectively. This may advantageously limit the amount of data that needs to be transmitted from one or both monitoring units, e.g. over a communication link to the other monitoring unit or to a remote processing system, for further processing to determine the position.

The apparatus may comprise a position localiser module (e.g. as a component of the processing system), which may be configured to determine (i.e. estimate) the position of the disturbance from the first and second data. It may be configured to determine the position from a difference between the first time and the second time. The position localiser module may be configured to receive the (e.g. time-stamped) first and second monitoring signals (which may form part of all of the first and second data). It may comprise an application-specific integrated circuit and/or one or more processors and memory storing software for execution by the processors. It may be located adjacent or proximate or integrated with the first monitoring unit or the second monitoring unit, or it may be remote from both monitoring units—e.g. comprising a network server. It may be connected to the first and second monitoring units by one or more wired or wireless channels. In some but not all embodiments, the position localiser module is configured to determine whether changes in the SOP of the first and second digital optical signals meet the first and second criterion respectively.

In some embodiments, the position of a disturbance may be determined using an algorithm that takes the first and second times as inputs, but that processes no other times of changes in SOP arising from the same disturbance. However, in other embodiments, the first and second data each represent a plurality of times of a plurality of SOP changes in each digital optical signal, some or all of which may arise from the disturbance, and the position is determined by processing the data representative of the plurality of SOP changes in each optical signal. The first and second data may, for example, each comprise a respective SOP signal comprising a time series of values representative of times of changes in SOP—e.g. comprising a time series of values representative of changes in SOP of the respective digital optical signal, with associated timing information (such as one or more time stamps). The time series may be regularly or irregularly spaced. Considering a plurality of SOP changes in each received signal, rather than just the time of a single SOP change, may improve the accuracy of the position determination process.

The processing system (e.g. within the position localiser module or at one or both monitoring units) may comprise one or more comparators or correlators configured to determine whether a change in the SOP in the first or second digital optical signal meets the first or second criterion respectively. The processing system may be configured to make this determination using the first and second monitoring signals. It will be appreciated that, by time-stamping the first and second monitoring signals, the first and second times (at which changes in the SOP meet the first and second criterion respectively) can be straightforwardly determined.

The first data may comprise a first series of values (i.e. a first SOP signal) representative of a plurality of changes in the SOP of the first digital optical signal over time. The series preferably includes or spans the first time, such the first SOP signal is representative of the change in SOP at the first time. The second data comprises a second series of values (i.e. a second SOP signal) representative of changes in the SOP of the second digital optical signal over time. This series preferably includes or spans the second time, such that the second SOP signal is representative of the change in SOP at the second time. Each SOP signal may comprise a respective monitoring signal, as disclosed above, or may comprise a portion thereof, or it may be derived from a respective monitoring signal. Each SOP signal preferably comprises timing information, such as one or more time stamps. Each SOP signal may be a time series of values, although this is not essential and each SOP signal may, in some embodiments, encode information in a frequency domain (e.g. after a Fourier transform).

The processing system (e.g. within the position localiser module) may be configured to compare or cross-correlate the first SOP signal with the second SOP signal, for determining the position of the disturbance. Each SOP signal (or the first and second data more generally) may encode or otherwise represent SOP (e.g. as a time-series of absolute or relative values), or a time derivative of SOP, or frequency or spectral information relating to changes in SOP over time (e.g. determined by Fourier analysis). The processing system may be configured to determine a similarity measure representative of a degree of similarity between the change or a series of changes in the SOP of the first optical signal at or spanning the first time and the change or a series of changes in the SOP of the second optical signal at or spanning the second time. The measure may represent similarity in magnitude of change, direction of change, pattern of change over time, or a combination of these. This may comprise determining a correlation coefficient between the SOP, or change in the SOP, at or over the first time, and the SOP, or change in SOP, at or over the second time. The similarity measure may comprise a correlation coefficient.

By correlating changes in the SOP received at the first and second light detectors, it can be determined whether the changes in the SOP are likely to have been caused by the same disturbance, based on how similar respective patterns of SOP changes are over time. If a particular pattern of change in the SOP is registered at only one of the monitoring units, then it is unlikely to have been caused by a disturbance, as this would result in a similar change in the SOP at both monitoring units. The processing system may be arranged to cross-correlate the first and second monitoring signals, or respective portions thereof.

The processing system may use a cross-correlation operation to determine a time difference between the respective times represented by the first and second data—e.g. based on a time location of a peak in the cross correlation. The processing system may be configured to perform the cross-correlation within a sliding time-window having a fixed size—i.e. limiting the cross-correlation to a maximum time shift. This can reduce the processing load. The size of the time-window may correspond to a maximum possible time difference between the first time and the second time, for the optical fibre assembly, based on the length of the optical fibre between the first and second monitoring units. This may correspond to the case in which the disturbance is located adjacent the first monitoring unit or the second monitoring unit.

The processing system may be configured to determine whether the similarity measure (e.g. correlation coefficient) exceeds a correlation threshold. In response to determining that the similarity measure exceeds the correlation threshold, the processing system may be configured to proceed to determine or output the position of the disturbance. The processing system may be configured only to proceed to determine or output the position of the disturbance in response to determining that the similarity measure exceeds the correlation threshold. In some embodiments, this may improve the efficiency of the apparatus, as it means that the processing system need not attempt to determine the position of a disturbance when a disturbance is unlikely to have occurred, and may reduce the chance of false (i.e. spurious) detections.

The processing system may be configured to determine the position of the disturbance as a distance along the optical fibre from the first monitoring unit or the second monitoring unit—e.g. as a value in metres. The processing system may be configured to determine the position of the disturbance as a set of coordinates, which may be in a local coordinate system or a global coordinate system (e.g. longitude and latitude). It may access map data to determine a two-dimensional position from a one-dimensional position along the optical fibre assembly.

Preferably the processing system is configured to determine the position of the disturbance from the time difference between the first time and the second time represented by the first and second data, and/or the length of the optical fibre assembly between the monitoring units, and/or the speed of transmission of the first and second digital optical signals within the optical fibre assembly.

The processing system may, in some embodiments, be configured to calculate the length of the optical fibre assembly, in time or distance, by measuring the roundtrip delay through a fibre or fibre pair of the assembly. Alternatively, length data may be provided to the processing system, e.g. as an installation parameter. This may be performed using the IEE 1588 Precision Time Protocol (PTP), for example.

Preferably apparatus is configured to synchronise the first clock and the second clock. The first clock and/or the second clock may comprise or be connected to synchronisation logic or circuitry in the respective monitoring units, which may be configured to synchronise the respective clock using a synchronization signal. In some embodiments, the first light detector and/or the second light detector may be configured to receive the synchronization signal over an optical fibre, e.g. a fibre between the first and second monitoring units.

In a first set of embodiments, the synchronization signal is received from an external source. In some embodiments, the synchronisation signal is a Global Positioning System (GPS) signal. The synchronization signal may be a Global Navigation Satellite System (GNSS) signal.

In a second set of embodiments, one of the first monitoring unit and/or the second monitoring unit is configured to transmit the synchronization signal to the other monitoring unit. The first monitoring unit may be configured to transmit a series of one or more time-stamped synchronization packets, generated using the first clock signal, over the fibre assembly, to the second monitoring unit. The second monitoring unit may alternatively or additionally be configured to transmit a series of one or more time-stamped synchronization packets, generated using the second clock signal, over the fibre assembly, to the first monitoring unit. Preferably respective time-stamped synchronisation packets are transmitted in both directions (i.e. from the first monitoring unit to the second monitoring unit and from the second monitoring unit to the first monitoring unit). This may enable synchronisation protocols such as PTP to be carried out effectively. The time-stamped synchronization packets may be embedded within the first and/or second digital optical signals—e.g. interleaved between data packets.

In some embodiments, the synchronization signal is transmitted over an optical fibre of the optical fibre optical fibre assembly, which may (but need not necessarily) be contained within a separate optical fibre cable to the optical fibre or optical fibre pair arranged to carry the first and second digital optical signals. However, in preferred embodiments, the synchronization signal is transmitted over the same optical fibre or pair of optical fibres as the first and/or second digital optical signal. The time-stamped synchronization packets may be transmitted on a dedicated wavelength using Wavelength Division Multiplexing. The synchronization signal may comprise time-stamped packets, e.g. as defined in IEEE 1588 Precision Time Protocol (PTP).

One or both monitoring units may be configured to use a received synchronization signal to synchronise a clock of the monitoring unit to a reference clock located away from the monitor unit, which may be the clock of the other monitoring unit or which may be a clock of a satellite.

The processing system may be distributed. The first monitoring unit may comprise some or all of the processing system. The second monitoring unit may comprise some or all of the processing system. A position localiser module may comprise some or all of the processing system. The processing system may comprise one or more computer processors and one or more memories storing software for execution by the processors. It may comprise digital sequential logic. It may comprise one or more FPGAs, ASICs, DSPs, or other electronic circuitry.

The apparatus may comprise a display screen or a loudspeaker or other output mechanism for informing a human user of the disturbance. The processing system may be configured to output a signal of a disturbance, which may include data representative of the determined position of the disturbance. It may output the signal to a monitoring client, e.g. over a network connection. It may output the signal immediately, or as part of a periodic batch process—e.g. a daily log file.

The applicant has identified that it may be desirable in some situations to determine a position of a disturbance by monitoring changes other than SOP. Thus when viewed from a further aspect, the invention provides an apparatus for determining a position of a disturbance to an optical fibre assembly, the apparatus comprising:

a first monitoring unit, comprising a first light detector and a first clock;

a second monitoring unit, comprising a second light detector and a second clock; and a processing system, wherein the apparatus is configured to:

receive, at the first monitoring unit, a first digital optical signal from an optical fibre assembly;

receive, at the second monitoring unit, a second digital optical signal from the optical fibre assembly;

monitor a parameter of the first digital optical signal received at the first light detector;

determine, using the first clock, first data representative of a first time, being a time at which a change occurs in said parameter of the first digital optical signal received at the first monitoring unit, arising from a disturbance to the optical fibre assembly;

monitor said parameter of the second digital optical signal received at the second light detector;

determine, using the second clock, second data representative of a second time, being a time at which a change occurs in said parameter of the second digital optical signal received at the second monitoring unit, arising from the disturbance; and process the first data and the second data to determine a position of the disturbance.

From another aspect, the invention provides a method of determining a position of a disturbance to an optical fibre assembly that is optically coupled to a first monitoring unit and to a second monitoring unit, the method comprising:

receiving, at the first monitoring unit, a first digital optical signal carried by the optical fibre assembly;

monitoring a parameter of the first digital optical signal received at the first monitoring unit;

receiving, at the second monitoring unit, a second digital optical signal carried by the optical fibre assembly;

monitoring said parameter of the second digital optical signal received at the second monitoring unit;

determining, using a first clock, first data representative of a first time, being a time at which a change occurs in the parameter of the first digital optical signal received at the first monitoring unit, the change arising from a disturbance to the optical fibre assembly;

determining, using a second clock, second data representative of a second time, being a time at which a change occurs in the state of polarisation of the second digital optical signal received at the second monitoring unit, the change arising from the disturbance; and processing the first data and the second data to determine a position of the disturbance.

From a further aspect, the invention provides a monitoring unit for use in a method of determining a position of a disturbance to an optical fibre assembly, the monitoring unit comprising a light detector and a clock, and being configured to:

receive a digital optical signal from an optical fibre assembly;

monitor a parameter of the digital optical signal received at the light detector; and determine, using the clock, data representative of a time at which a change occurs in the parameter of the digital optical signal received at the light detector, the change arising from a disturbance to the optical fibre assembly and the data being suitable for processing to determine a position of the disturbance.

The parameter is preferably a parameter that can be determined non-coherently—i.e. without requiring the use of a local phase reference source (such as a tuned laser) at the monitoring units. This can make embodiments well suited for implementation in apparatus that uses non-coherent decoders (although use with coherent decoders is not excluded).

In some preferred embodiments, the parameter is amplitude. In other preferred embodiments, the parameter is a signal-to-noise ratio. In further preferred embodiments, the parameter is a measure of demodulation or decoding performance, such as a bit error ratio (BER) or a packet error ratio (PER).

Features of any aspect or embodiment described herein may, wherever appropriate, be applied to any other aspect or embodiment described herein. In particular, features disclosed with reference to SOP may, wherever appropriate, be applied to the parameter of embodiments of these latter aspects also (e.g. applied equally to amplitude, SNR, BER, etc.).

Where reference is made to different embodiments or sets of embodiments, it should be understood that these are not necessarily distinct but may overlap.

BRIEF DESCRIPTION OF THE DRAWINGS

A preferred embodiment of the invention will now be described, by way of example only, with reference to the accompanying drawings, in which:

FIG. 1 shows a schematic view of a position determination apparatus 1 in accordance with an embodiment of the present invention, comprising a submarine bi-directional optical fibre communications cable 2 and two transceivers 6, 8 (embodying respective monitoring units as disclosed above). The apparatus 1 also comprises a position localiser module 30 (shown in FIG. 2). The communications cable 2 extends along a seabed 4 so as to allow communication between a first transceiver 6 and a second transceiver 8.

Figure 1:
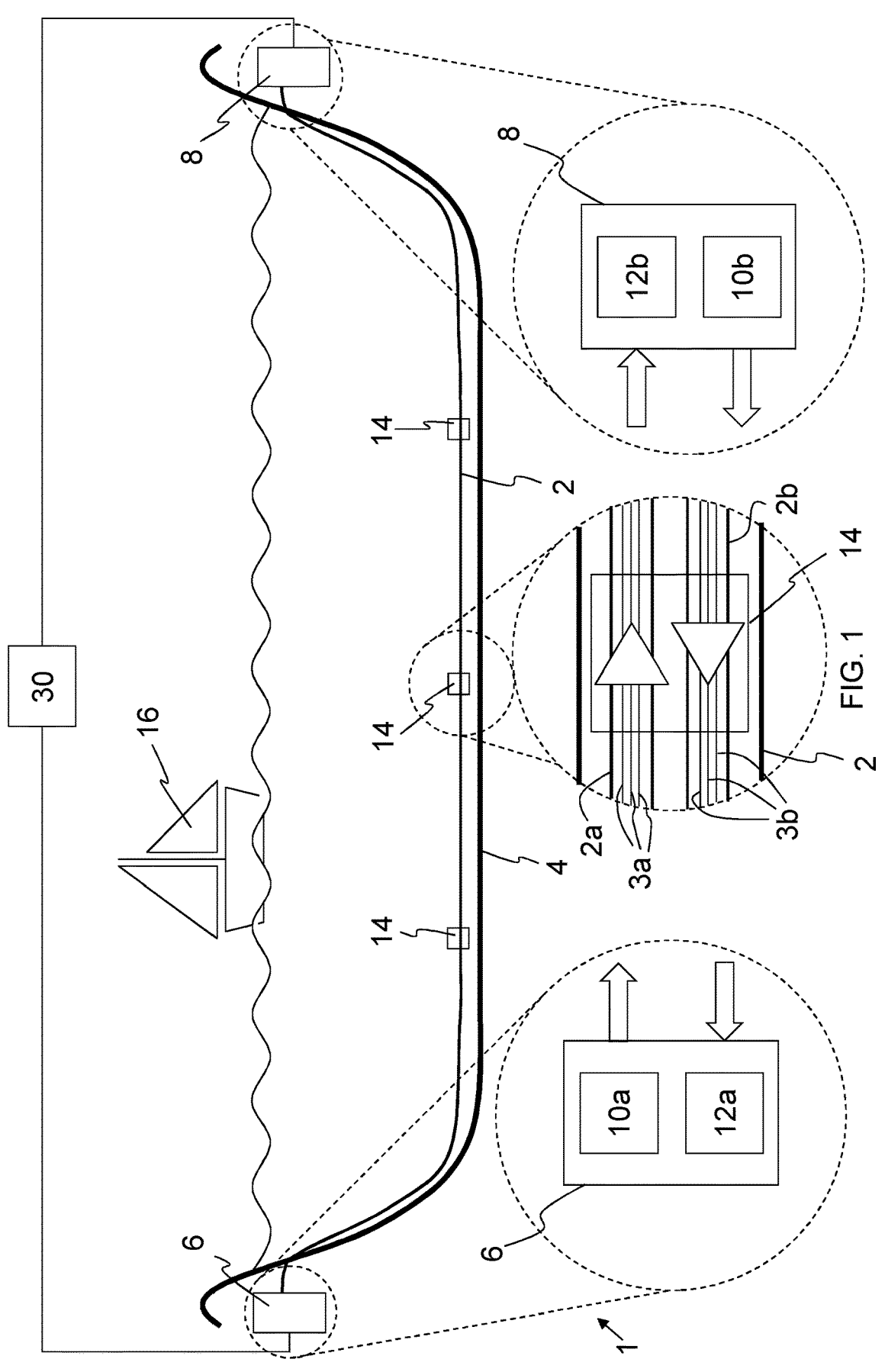
FIG. 1 is a schematic view of a position determination apparatus in accordance with an embodiment of the present invention.

The first and second transceivers 6, 8 contain respective optical transmitters 10a, 10b (e.g. each comprising a laser diode and a modulator) and optical receivers 12a, 12b (e.g. each comprising a photodiode, amplifier and demodulator). In this exemplary embodiment, the receivers 12a, 12b are coherent receivers, such as respective AC1200 modules from Acacia Communications Inc.™, which are suitable for demodulating phase-modulated digital optical signals (e.g. QAM-modulated signals), although in other embodiments they could be non-coherent receivers. The optical fibre cable 2 (an optical fibre assembly as disclosed above) comprises two groups 2a, 2b of optical fibres 3a, 3b. A large number of optical fibres 3a, 3b may be embedded within the same cable 2 in optical fibre communications systems so as to provide a high availability of fibre connectivity to telecommunication operator customers. However, in a simple case, the cable 2 could contain just two fibres 3a, 3b, for communicating in opposite directions.

The first optical fibre group 2a carries digital optical signals from the transmitter 10a of the first transceiver 6 to the receiver 12b of the second transceiver 8. The second optical fibre cable group 2b carries digital optical signals from the transmitter 10b of the second transceiver 8 to the receiver 12a of the first transceiver 6. Thus, the optical fibre cable 2 provides bi-directional communication between the first and second transceivers 6, 8.

In other bi-directional embodiments, the optical fibre link may consist of two separate optical fibre cables, laid parallel and in close proximity for at least a majority of their length (e.g. touching or separated by an average or maximum of at most five metres along a majority or all of their lengths), each containing one or more optical fibres, where the optical fibres in each cable are arranged to carry signals in opposite directions.

Furthermore, in some embodiments, different data streams may be sent in opposite directions along the same fibre, e.g. using Wavelength Division Multiplexing (WDM), in which light of a different wavelength is used for the transmission of each data stream, or using or polarisation-division multiplexing (PDM), in which light waves having different polarisation states are used for the transmission of each data stream.

A disturbance of the optical fibre cable 2 may be any displacement or vibration of the cable 2 that might indicate or prelude possible interference to digital communications along the cable 2 or physical damage to the cable 2.

Disturbances or breakages in the optical fibre cable 2 can be caused in a number of ways. Natural phenomena such as earthquakes or tsunamis may cause the optical fibre cable 2 to be moved or to vibrate in such a way as to damage the cable 2 or to otherwise disrupt the communications being transmitted between the transceivers 6, 8. Moreover, human activity may cause similar disturbances. Fishing vessels such as trawlers 16 can move and potentially damage the cable 2 if fishing equipment becomes entangled in the cable 2. Disturbances in the optical fibre cable 2 may also indicate the installation of eavesdropping equipment, e.g. for espionage purposes.

Regardless of the cause of the disturbance, it is beneficial to be able to determine accurately its location so that the situation can be dealt with quickly, whether by physical inspection, or repairing any damage to the optical fibre cable 2, or reporting inappropriate activity to a relevant authority, or monitoring for future issues, or by removing surveillance equipment, etc. Determining the position of the disturbance along the cable 2, as well as the time that the disturbance took place, can also be helpful in identifying a vessel responsible for the incident.

Owing to attenuation of the optical signal within the optical fibres 3a, 3b of the optical fibre cable 2, Erbium Doped Fibre Amplifiers (EDFA) 14 may be positioned at intervals of typically 100 km along the optical fibre cable 2. The EDFAs 14 amplify the optical signals within the optical fibres 3a, 3b. In other embodiments, alternative amplifying techniques may be implemented, e.g. using Raman amplifiers.

The EDFAs 14 comprise isolators which prevent the reflection of light back along the optical fibres 3a, 3b towards the transmitters 10a, 10b. This means that Optical Time Domain Reflectometer (OTDR) methods involving the measurement of backscattered signals cannot be used to detect disturbances in the optical fibre cable 2 that occur beyond the first EDFA 14 that is encountered after the respective source transceiver 6 or 8.

However, the state of polarization (SOP) of the light signals propagating through the EDFAs 14 is unaffected by the EDFAs 14. If the fibre cable 2 is physically moved, or if vibrations occur in the cable 2, it is likely that SOP changes will also occur in all of the optical fibres 3a, 3b within the cable 2 at the position where the movement occurs. If the movement results in, for example, a bending of the cable 2, it is likely that attenuation of the signals in all of the fibres 3a, 3b, at the same position along the cable 2, will also occur. Moreover, the attenuation may exhibit a similar temporal pattern in multiple fibres 3a, 3b.

In optical coherent data-transmission systems, physical parameters such as SOP and signal strength can be measured by the respective off-the-shelf coherent signal receiver 12a, 12b. Therefore, a change in the SOP of a digital optical signal arising from a disturbance to the optical fibre cable 2 can be detected by the respective destination transceiver 6, 8. Thus, by monitoring the SOP of the light signals received at each transceiver 6, 8, a disturbance anywhere along the optical fibre cable 2 can be detected. For embodiments using receivers that do not output SOP and amplitude values, a separate monitoring system may be provided. This may comprise an optical splitter configured to separate the received optical signal into an optical 'monitoring' signal and an optical data signal. The monitoring signal may be split into two different (e.g. orthogonal) polarisations using a polarisation beam splitter, with a pair of photodiodes being used to sample the amplitude at each polarisation, to determine a two-dimensional SOP value for each sample period. Although using a polarisation beam splitter is a simple and inexpensive method for measuring polarisation, any other suitable or desired method may be used. For example, a three-dimensional SOP value may be found on a Poincare sphere using determined Stokes parameters. The data signal may be separately converted to an electrical signal by another optical-electrical converter.

Depending on the type of movement experienced by the optical fibre cable 2, a similar change in SOP or attenuation is likely to be experienced over a certain time period by signals in each of the optical fibres 3a, 3b within the cable 2, including in signals travelling in opposite directions past the site of the disturbance. Thus, a disturbance can be detected using both transceivers 6, 8 by measuring the SOP and/or attenuation of the optical signals, received from each optical fibre group 2a, 2b, at each end of the cable 2. Moreover, a location of the disturbance along the cable 2 can be estimated from information relating to the timing of the effect of the disturbance on the SOP and/or attenuation of signals received at each end of the cable 2, as explained in more detail below.

Additional analysis of the parameter changes (e.g. together with analysis of changes in further parameters such as amplitude, SNR or BER) may allow the type of disturbance that is most likely to have caused the changes to be determined. Such analysis could involve machine-learning or other signal-processing techniques.

Figure 2:
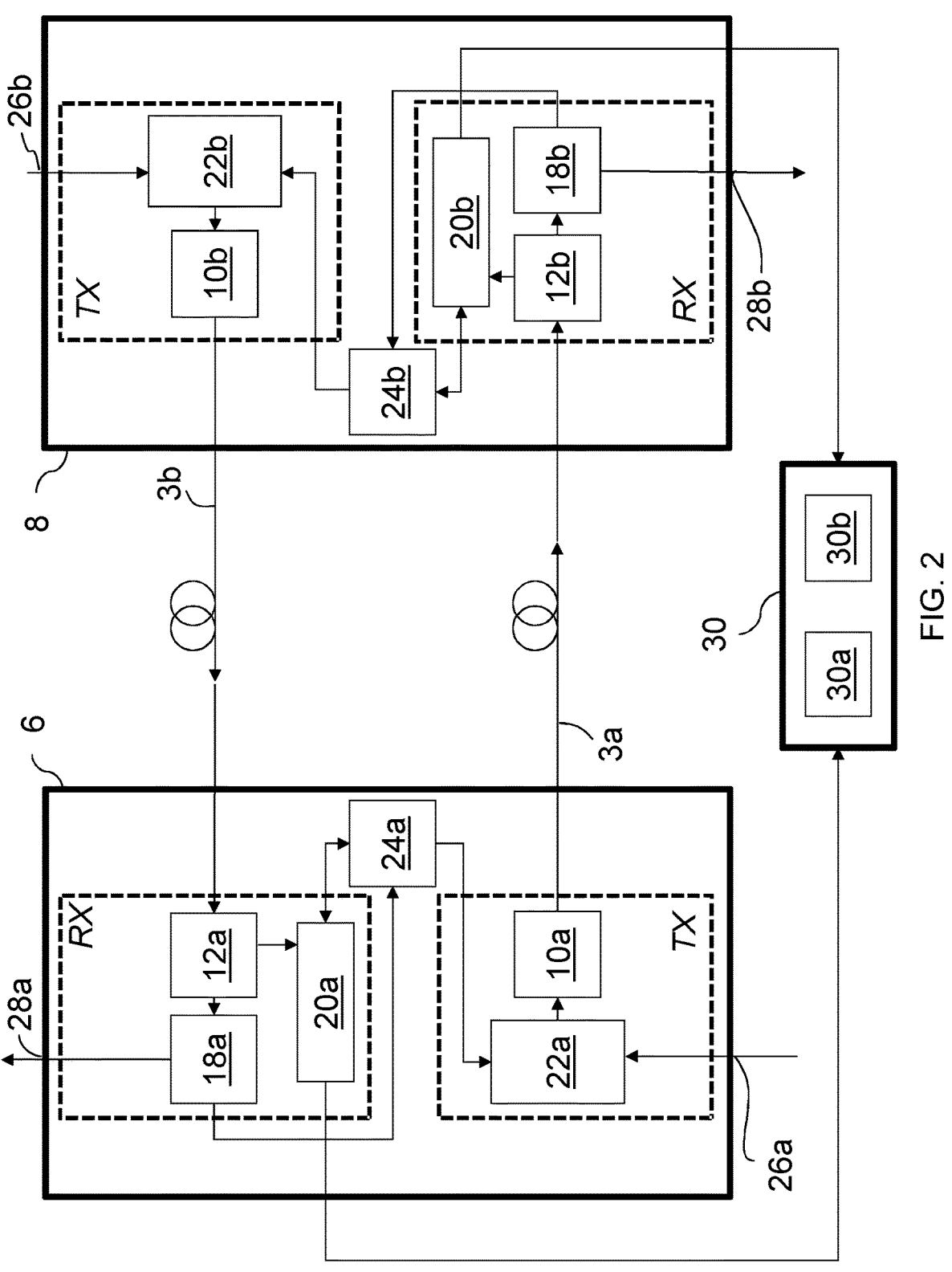
FIG. 2 is a more detailed schematic view of the position determination apparatus of FIG. 1.

FIG. 2 shows a more detailed schematic view of the transceivers 6, 8 of the position determination apparatus 1 as shown in FIG. 1.

The first transceiver 6 comprises the optical transmitter 10a, the coherent receiver 12a, an electrical splitter module 18a, an electrical correlator 20a, and an electrical combiner 22a. The first transceiver 6 further comprises a clock 24a that generates a first timing signal, e.g. using a first quartz crystal and associated frequency-adjustment circuitry in the first transceiver 6. The clock 24a may include circuitry for synchronising the clock, as described below.

The second transceiver 8 has a corresponding design to the first transceiver 6, with like components labelled with the same numerals, but sufficed with the letter "a" for the first transceiver 6 and "b" for the second transceiver 8. In particular, the second transceiver 8 comprises the optical transmitter 10b, the coherent receiver 12b, an electrical splitter module 18b, an electrical correlator 20b, and an electrical combiner 22b. The second transceiver 8 further comprises a clock 24b that generates a second timing signal, e.g. using a second quartz crystal and associated frequency-adjustment circuitry located in the second transceiver 8. The clock 24b may include circuitry for synchronising the clock, as described below.

Each of the splitter module 18a, correlator 20a and combiner 22a may include electronic logic circuitry for performing operations on incoming electrical signals. They may include an FPGA, or a computer processor and a memory comprising software for execution by the processor, in order to carry out operations described herein.

In alternative embodiments, the conversions between optical and electrical signals could be performed at different points within the transceivers 6, 8, such that, for instance, the splitting operation could be performed in the optical domain.

The position determination apparatus 1 further comprises a position localiser module 30, which is in communication with both the first transceiver 6 and the second transceiver 8. The position localiser module 30 could be integrated with, or located alongside, one or other of the transceivers 6, 8, or it could be located remotely from both—e.g. in a datacentre or server farm. The connection between the position localiser 30 and the transceivers 6, 8 may comprise one or more electrical cables and/or optical cables and/or wireless (e.g. radio) links. These could be dedicated connections, or they could be part of a larger network, e.g. the Internet.

The position localiser module 30 may comprise a processor 30a and a memory 30b storing software, for execution by the processor 30a, for implementing processing operations as described herein. It may have one or more network interfaces, a power supply, and any other components of a computer or computing device.

Transmission of an optical data signal from the first transceiver 6 to the second transceiver 8 via an individual optical fibre 3a will now be described. It will be appreciated that the process is substantially the same for sending a further optical data signal in the reverse direction, from the second transceiver 8 to the first transceiver 6. In this embodiment, signals in opposite directions are sent on different respective fibres 3a, 3b. However, in other embodiments, they could be sent simultaneously along a common fibre, e.g. using different wavelengths of lights.

The first transceiver 6 receives an electrical data signal, comprising a stream of data packets, at a data input 26a, for sending over the optical fibre 3a to the second transceiver 8, and eventually for outputting from the second transceiver 8 from a data output 28b. Similarly, the second transceiver 8 receives an electrical data signal, comprising a stream of data packets, at a data input 26b, for sending over the same or a second optical fibre 3b to the first transceiver 6, and eventually for outputting from the first transceiver 6 from a data output 28a.

The first transceiver 6 passes the received data signal to a combiner 22a, in its transmission (TX) circuitry, which receives the electrical data signal and an electrical timing signal from the clock 24a. The electrical timing signal comprises, or is processed by the electrical combiner 22a to generate, a succession of time-stamped packets (e.g. as defined in IEEE 1588 Precision Time Protocol (PTP)) for clock synchronization purposes. In this embodiment, the first transceiver 6 serves as the master clock and the second transceiver 8 serves as the slave clock.

However, it will be appreciated from the circuitry of the embodiment described herein that both transceivers 6, 8 are capable of providing the master clock signal to the other. Moreover, although in this embodiment the master clock signal is generated locally, in other embodiments the master clock signal is an external (e.g. GPS) signal.

The combiner 22a generates, from the incoming electrical data signal and the electrical timing signal, a combined electrical signal, comprising data packets and time-stamped synchronization packets, appropriately interleaved or combined, that is provided to the transmitter 10a for conversion to an optical signal that is transmitted to the second transceiver 8 via an optical fibre 3a of the optical fibre cable 2. Thus, the combined signal is time-stamped according to the time, according to the first clock 24a, at which the optical signal is transmitted from the first transceiver 6. This is used for synchronisation of the clocks 24a, 24b, as will be described in more detail below. In some embodiments, the time-stamped synchronization packets may be sent on a separate wavelength within the same optical fibre 3a as the data packets (e.g. using Wavelength Division Multiplexing). However, in other embodiments, the time-stamped synchronization packets may be sent in a separate optical fibre 3a to the data packets.

The transmitter 10a comprises a laser diode for converting the received combined signal into an optical signal, which is then transmitted to the second transceiver 8 via the optical fibre 3a of the optical fibre cable 2. Further optical signals may be transmitted in the same way via other optical fibres 3a in the same optical fibre cable 2. Between the transmitter 10a of the first transceiver 6 and the second transceiver 8, the optical signals may be amplified by the EDFAs 14 (shown in FIG. 1).

On the receiving (RX) side of the second transceiver 8, the coherent receiver 12b generates an electrical monitoring signal indicative of the SOP of the received optical signal. The received optical signal is converted into an electrical signal and separated, by the electrical splitter module 18b, into:

an electrical data signal, comprising the received data packets, for outputting from the output 28b for processing or onward transmission; and an electrical timing signal, comprising the received time-stamped PTP synchronization packets.

The electrical monitoring signal indicative of the SOP is provided to the correlator 20b by the coherent receiver 12b. The electrical monitoring signal is time-stamped, by the correlator 20b, with a time of arrival at the second transceiver 8 using a time signal provided by the second clock 24b.

The electrical timing signal, comprising the received time-stamped PTP packets, is sent to the clock 24b for synchronisation purposes, as will be described in more detail below.

The electrical data signal is forwarded to a further component, e.g. a processor, via a data output 28b of the second transceiver 8.

Both transceivers 6, 8 are configured to process of the optical signals received via each optical fibre 3a, 3b respectively in the same way. It will be appreciated that, in the presently described embodiment, the monitoring system is embedded as part of the optical transmission system, meaning that the installation of separate infrastructure is not required.

The correlator 20b is configured to time-stamp the electrical monitoring signal from the coherent receiver 12b. The electrical monitoring signal conveys the SOP over time of the signal transmitted in the optical fibre 3a—e.g. as a time-series of sample values, representative of polarization state, taken at regular time intervals. The correlator 20b comprises logic circuitry for detecting when a change in the SOP of the signal exceeds a threshold value. It may do this by comparing each SOP sample with the immediately-preceding SOP sample and determining if they are different by more than the threshold amount, or by comparing or correlating each sequence of samples with a sequence of earlier-received samples using a sliding time window, e.g. by calculating a vector dot product, and determining if this correlation coefficient exceeds a threshold, or in any other way.

If it determines that the change in SOP is greater than a threshold value, the correlator 20b forwards a portion of the time-stamped electrical monitoring signal to the position localiser 30. Thus, the correlator 20b can be thought of as filter that informs the position localiser 30 of significant changes in the SOP of the transmitted optical signal, including the time of such changes.

When a disturbance causes a significant change in polarisation to signals travelling in both directions along the cable 2, the position localiser 30 will also receive a time-stamped monitoring signal from the correlator 20a of the first transceiver 6, which operates in the same way as the correlator 20b. Thus, each correlator 20a, 20b is configured to forward to the position localiser module 30 time-stamped monitoring signals that are indicative of changes in SOP that are above a certain threshold, and thus suggest the occurrence of a disturbance to the optical fibre cable 2.

The time stamps received by the position localiser module 30 from each transceiver 6, 8 are synchronized to a common time reference. This synchronisation of the clocks 24a, 24b may, in some embodiments, be performed as follows.

As described above, the electrical splitter 18b is configured to separate an electrical timing signal, comprising time-stamped PTP synchronization packets, from the signal received at the coherent receiver 12b of the second transceiver 8.

The time-stamped PTP synchronization packets encode timing information representative of the time at which the combined signal was transmitted from the first transceiver 6. As the time at which the combined signal arrived at the second transceiver 8 is also known, the timing information can be used, together with a known end-to-end path delay for the propagation of the packets through the optical fibre cable 2 between the transceivers 6, 8, to synchronise the clock signals provided by clocks 24a, 24b. The first and second transceivers 6, 8 may both be configured so as to be capable of providing a clock calibration signal to the other, as is shown in FIG. 2. However, in practice, it may be sufficient for one clock 24a, 24b to act as a master clock and the other to act as a slave clock, which is resynchronized to the master clock at regular intervals. In other embodiments, a master clock signal may be received from an external source.

This synchronisation process can be performed at intervals (e.g. once every hour, or once every second) alongside the transmission of data packets across the optical fibre cable 2.

Synchronising the clock of 24a of the first transceiver 6 with the clock 24b of the second transceiver 24b means that the monitoring signals generated by the coherent receivers 12a, 12b are time-stamped by the correlators 20a, 20b respectively according to a common time reference. This allows the position localiser 30 to determine an accurate time difference between significant changes in SOP in the optical signals received at each transceiver 6, 8, as will be described below.

Figure 3:
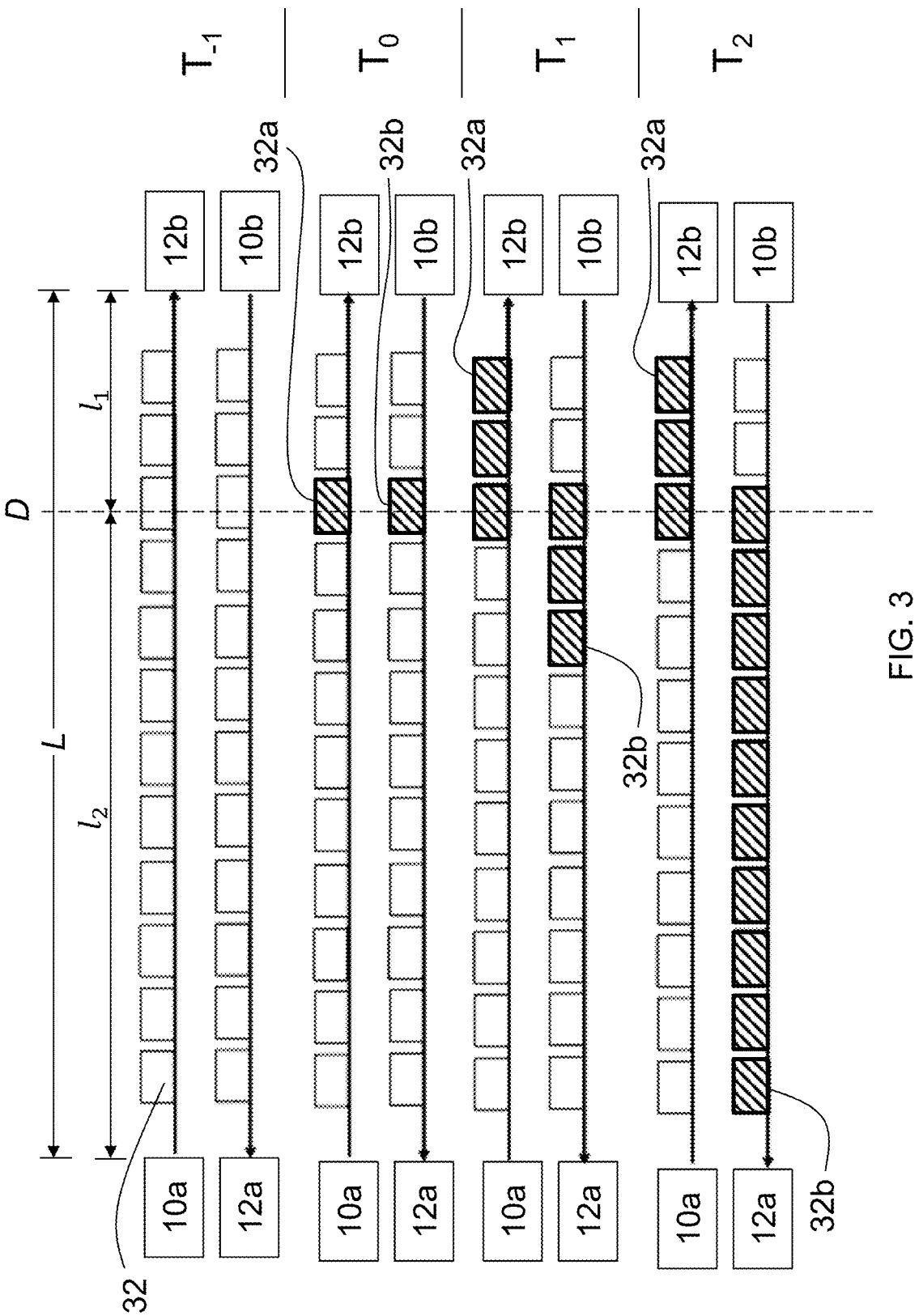
FIG. 3 is a schematic representation of the propagation of optical data packets though the system of FIG. 1.

FIG. 3 shows a schematic representation of the propagation of optical data packets though the system of FIG. 1. In FIG. 3, the horizontal axis is representative of the distance between the first transceiver 6 and the second transceiver 8, while progressive instances $T_{-1}$, $T_0$, $T_1$, $T_2$ in time are represented along the vertical axis. The total length L of optical fibre 3a connecting the transmitter 10a of the first transceiver 6 to the coherent receiver 12b of the second transceiver 8 is equal to the total length L of optical fibre 3b connecting the transmitter 10b of the second transceiver 8 to the coherent receiver 12a of the first transceiver 6. The length L of the optical fibres 3a, 3b may be calculated by measuring the roundtrip delay through the fibres 3a, 3b, using the PTP protocol or similar.

The top two rows of FIG. 3 show the transmission of discrete data packets 32 between the transmitter 10a of the first transceiver 6 and the receiver 12b of the second transceiver 8 and between the transmitter 10b of the second transceiver 8 and the receiver 12a of the first transceiver 6 during normal conditions at time $T_{-1}$.

At time $T_0$ (shown in FIG. 3 by the third and fourth rows from the top), a disturbance to both optical fibres 3a, 3b occurs at an unknown position D between the first transceiver 6 and the second transceiver 8. As a result of the disturbance, a change occurs in the SOP of data packets 32a, 32b, within both optical fibres 3a, 3b, located at position D. The affected data packets 32a, 32b are shaded in FIG. 3.

At time $T_1$, the first-affected data packets 32a, 32b within the optical fibres 3a, 3b have propagated towards the second and first transceivers 8, 6 respectively, at equal speeds (the speed of light through the fibres 3a, 3b), such that the data packet 32a of optical fibres 3a that was first affected by the disturbance at position D has arrived at the receiver 12b of the second transceiver 8. It can be seen from the shaded packets in FIG. 3 that all subsequent data packets exhibit the new, post-disturbance SOP as they propagate through the fibres 3a, 3b past position D. This first-affected data packet 32a has travelled the distance $l_1$ since the disturbance at position D occurred at time $T_0$.

The disturbance may result in a permanent change in SOP or a change that varies over time. Typically the SOP change will be sufficiently slow to be observed at the receivers during a period longer than the delay through the fibre. Mechanical vibrations may cause SOP variations in the order of a few hertz, or fractions of hertz, whereas electromagnetic fields (such as those caused by lightning strikes in the case of aerial cables) may cause changes in the order of Mega-Hertz. Hence it may be that the change in SOP propagates through the fibre only as a short pulse, which may have a duration of a few microseconds.

The change in SOP, caused by the disturbance at position D, can now be detected by using the coherent receiver 12b and correlator 20b of the second transceiver 8. The correlator 20b detects when the change in SOP is greater than the threshold value. When this detection occurs, the transceiver 8 forwards a portion of the time-stamped monitoring signal covering at least the first-affected packet 32a to the position localiser 30.

At time $T_2$, which is after time $T_1$ in this example, the first-affected data packet 32b of optical fibre 3b arrives at the receiver 12a of the first transceiver 6. This data packet 32b has travelled the distance $l_2$ (where $l_1 + l_2 = L$) since the disturbance at position D occurred at time $T_0$.

As described above, the change in SOP caused by the disturbance at D is able to propagate through the optical fibre 2b and the EDFAs 14. Thus, the change in SOP is detected by the coherent receiver 12a of the first transceiver 6. The correlator 20a determines, in the same way as described above, that the change in SOP is greater than the threshold value. In response, a portion of the time-stamped monitoring signal is provided to the position localiser 30.

The position localiser module 30 is configured to receive the time-stamped monitoring signals from the correlators 20a, 20b and performs cross-correlation steps on the respective portions of the time-stamped monitoring signals to detect similar temporal changes to the SOP of the optical signals received by the two transceivers 6, 8, occurring within a time window of each other.

When a sufficiently strong similarity is found between a change in SOP in the optical signals transmitted through the first optical fibre cable 2a and a change in SOP in the optical signals transmitted through the second optical fibre cable 2b, the position localiser 30 determines that the respective changes in SOP were caused by the same disturbance. It will be appreciated that the similar changes in SOP will generally be detected at respective transceivers 6, 8 at different times, unless the disturbance occurs exactly half way between the transceivers 6, 8.

Detecting a correlated change in the SOP is performed within a defined time-window $T_{window}$. The size of the time-window $T_{window}$ is limited by the path length L of the optical fibre cable 2 being monitored. A maximum propagation time of a SOP change (i.e. caused by a disturbance) will be observed when the SOP change occurs at the location of one of the transceivers 6, 8, as the change must then propagate through the entire length L of the cable 2 for it to be detected by the other transceiver 6, 8. The time taken for the SOP change to reach the other transceiver 6, 8, i.e. the time-window length $T_{window}$, is calculated using the length L of the cable 2 and the speed of transmission $c_f=c/n$ in the optical fibres 3a, 3b, where c is the speed of light in a vacuum and n is the refractive index of the optical fibres 3a, 3b. The speed of transmission $c_f$ is taken to be the same in both fibres 3a, 3b.

The time-window length is given by:

$$T_{window} = \frac{L}{c_f} \tag{1}$$

The detection and correlation of the measured SOP occurs continuously over the common duration of the monitoring portions forwarded by the transceivers 6, 8 whenever they have detected changes above the threshold. The time-window $T_{window}$ is thus continually shifted with time, and is synchronised with the synchronised clocks 24a, 24b. The position localiser 30 calculates a correlation coefficient, over time, for the two signal portions, which it checks against a predetermined significance threshold.

When the position localiser 30 detects a significant correlation, within the time window $T_{window}$, it proceeds to determine, using the time-stamped monitoring signals provided by the correlators 20a, 20b, times of arrival $T_1$ and $T_2$ of the changes in SOP at the second and first transceivers 6, 8 respectively. Owing to the synchronisation of the clocks 24a, 24b of the first and second transceivers 6, 8 respectively, the times $T_1$ and $T_2$ can be used by the position localiser 30 to calculate an accurate value of the time $T_2-T_1$ between the detection of the change in SOP at the receiver 12b of the second transceiver 8 and the detection of the change in SOP at the receiver 12a of the first transceiver 6.

In some variant embodiments, instead of checking against local thresholds and forwarding only a portion of each monitoring signal, each correlator 20a, 20b may be configured to forward the entire respective monitoring signal to the position localiser 30 continuously, and the position localiser 30 may continuously cross-correlate the signals received from the correlators 20a, 20b to determine a time difference between correlated significant changes. However, this may not be practicable in every situation, due to the high data bandwidth required.

In some further variant embodiments, each correlator 20a, 20b processes the respective monitoring signal and then simply signals an above-threshold change in SOP to the position localiser 30 by sending a single respective time value, e.g. $T_1$, of the detected significant change in SOP, without sending any portion of the monitoring signal. The position localiser 30 may then check that two respective time values signalled by the respective transceiver units 6, 8 are within a maximum permitted time window, and determine the position by subtracting the earlier time from the later time. This approach is simpler to implement than performing cross-correlation at the position localiser module 30, but may generate more false detections.

In all cases, the distance $l_1$ between the receiver 12b and the disturbance D is given by:

$$l_1=c_f(T_1-T_0) \tag{2}$$

and the distance $l_2$ between the receiver 12a and the disturbance D is given by:

$$l_2=c_f(T_2-T_0) \tag{3}$$

Thus, the time difference $T_2-T_1$ is equal to:

$$T_2 - T_1 = \frac{l_2 - l_1}{c_f} \tag{4}$$

Solving for $l_1$ and $l_2$, given that $L=l_1+l_2$, provides:

$$l_1 = \frac{L}{2} - c_f\left(\frac{T_2 - T_1}{2}\right); \text{ and} \tag{5}$$

$$l_2 = \frac{L}{2} - c_f\left(\frac{T_1 - T_2}{2}\right) \tag{6}$$

Thus, knowing with the propagation speed $c_f$ and the length L of the fibres 3a, 3b, the position localiser can use the time difference $T_2-T_1$ to calculate one or both of the distances $l_1, l_2$ between the position of the disturbance D and the receivers 12a, 12b respectively. This means that a precise position of the disturbance D can be determined.

The position localiser module 30 may determine the location as a distance along the cable 3, or it may have access to map data representative of a geographical location of the cable 2, and so calculate a coordinate of the disturbance (e.g. latitude and longitude). It may comprise a display screen or a loud speaker or other output mechanism to alert a human user to the detection. Alternatively or additionally it may output a signal of a significant detection, including the location estimate, to a remote monitoring client, e.g. over a network connection. It may output the signal immediately, or as part of a periodic batch process—e.g. a daily log file. Any of these mechanisms can allow maintenance of the cable 2 to be undertaken, or any other approach action take, as appropriate, without undue delay, as a worker can be directed accurately to the location of the disturbance.

In some embodiments, as well as monitoring polarisation, the correlators 20a, 20b may monitor one or more further parameters, such as optical power or amplitude, signal phase, signal-to-noise ratio (SNR), and/or bit error ratio (BER), to detect significant changes in each further parameter over, which may arise from a disturbance along the cable 2. The position localiser module 30 may detect similar patterns of parameter changes over time occurring at both transceivers 6, 8, separated by less than the time window $T_{window}$.

The correlators 20 may monitor both SOP and another parameter such as amplitude, and may signal when one or other of these changes significantly. The position localiser module 30 may then be configured to detect similar patterns of SOP changes from the two transceivers 6, 8 and to detect similar patterns of amplitude (or other parameter) changes from the two transceivers 6, 8. For reliably detecting disturbances that can affect both parameters, e.g. SOP and amplitude, at the same time, the position localiser 30 may cross-correlate the changes in SOP with the changes in amplitude (or other parameter); it may do this between the SOP signal and amplitude signal output by one transceiver 6, 8 and/or between the signals output by the pair of transceivers 6, 8.

In a variant set of embodiments, instead of sending time-stamped synchronization packets, the first and second transceivers 6, 8 may contain GPS receivers and may use GPS signals to synchronize their respective clocks 24*a*, 24*b*.

In some variant embodiments, instead of sending packets in opposite directions along two different fibres, they may be sent along a single fibre, e.g. using two different wavelengths.

In some embodiments, instead of a sub-sea cable, the system may be used to monitor a land-based communications cable, such as a buried cable or an aerial cable. In this case, a disturbance could be caused by a lightning strike or a falling tree, in addition to vehicle collisions, earthquakes, etc.

More generally, it will be appreciated by those skilled in the art that the invention has been illustrated by describing certain specific embodiments thereof, but is not limited to these embodiments; many variations and modifications are possible, within the scope of the accompanying claims.

The invention claimed is:

1. An apparatus for determining a position of a disturbance to an optical fiber assembly, the apparatus comprising:
    a first monitoring unit, comprising a first light detector, a first clock, and first state-of-polarization-measuring apparatus configured to measure a state of polarization of a digital optical signal received at the first light detector;
    a second monitoring unit, comprising a second light detector, a second clock, and second state-of-polarization-measuring apparatus configured to measure a state of a polarization of a digital optical signal received at the second light detector; and
    a processing system,
wherein the apparatus is configured to:
    receive, at the first monitoring unit, a first digital optical signal from an optical fiber assembly;
    receive, at the second monitoring unit, a second digital optical signal from the optical fiber assembly;
    monitor a state of polarization of the first digital optical signal received at the first light detector;
    determine, using the first clock, first data representative of a first time, being a time at which a change occurs in the state of polarization of the first digital optical signal received at the first light detector, the change arising from a disturbance to the optical fiber assembly, wherein the first data encodes a time derivative of the state of polarization for the first digital optical signal;
    monitor a state of polarization of the second digital optical signal received at the second light detector;
    determine, using the second clock, second data representative of a second time, being a time at which a change occurs in the state of polarization of the second digital optical signal received at the second light detector, the change arising from the disturbance, wherein the second data encodes a time derivative of the state of polarization for the second digital optical signal; and
    process the first data and the second data to determine a position of the disturbance.

2. The apparatus of claim 1, wherein the processing system is configured to determine the position of the disturbance from a difference between the first time and the second time.

3. The apparatus of claim 2, wherein the processing system is configured to determine the position of the disturbance additionally from:
    a length of the optical fiber assembly between the first and second monitoring units; and
    a speed of transmission of the first and second digital optical signals within the optical fiber assembly.

4. The apparatus of claim 1, wherein the processing system is configured to:
    determine the first time by determining that a change in the state of polarization of the first digital optical signal meets a first criterion;
    determine the second time by determining that a change in the state of polarization of the second digital optical signal meets a second criterion; and
    process the first data and the second data to determine a position of the disturbance in response to determining that the first criterion and the second criterion are met.

5. The apparatus of claim 4, wherein the first criterion is that the change in the state of polarization of the first digital optical signal exceeds a first threshold and wherein the second criterion is that the change in the state of polarization of the second digital optical signal exceeds a second threshold.

6. The apparatus of claim 1, wherein:
    the first data comprises a first series of values representative of changes in the state of polarization of the first digital optical signal over time;
    the second data comprises a second series of values representative of changes in the state of polarization of the second digital optical signal over time; and
    the processing system is configured to perform a cross-correlation operation between the first data and the second data when determining the position of the disturbance.

7. The apparatus of claim 1, wherein the apparatus further comprises an optical analysis system, comprising:
    a first optical analysis component, configured to output a first monitoring signal that represents changes in the state of polarization of the first digital optical signal; and
    a second optical analysis component, configured to output a second monitoring signal that represents changes in the state of polarization for the second digital optical signal;
wherein the processing system is arranged to cross-correlate the first monitoring signal and the second monitoring signal to determine a time difference between the first time and the second time.

8. The apparatus of claim 7, wherein:
    the first optical analysis component is configured to time-stamp the first monitoring signal according to times that the first digital optical signal arrives at the first light detector, using the first clock; and
    the second optical analysis component is configured to time-stamp the second monitoring signal according to times that the second digital optical signal arrives at the second light detector, using the second clock.

9. The apparatus of claim 1, wherein the apparatus is configured to synchronize the first clock and the second clock.

10. The apparatus of claim 9, wherein the second monitoring unit is configured to transmit a series of one or more time-stamped synchronization packets, generated using a clock signal provided by the second clock, to the first monitoring unit.

11. The apparatus of claim 10, wherein the time-stamped synchronization packets are embedded within the first digital optical signal.

12. The apparatus of claim 1, wherein the apparatus is configured to monitor a further parameter of one or both of the first and second digital optical signals, received at the respective light detectors, in addition to monitoring the state of polarization, wherein the further parameter is amplitude, phase, signal-to-noise ratio, or bit error ratio, and wherein the apparatus is configured to process data representative of the further parameter, for one or both of the first and second digital optical signals, when determining the position of the disturbance.

13. The apparatus of claim 1, further comprising the optical fiber assembly, and wherein the optical fiber assembly is arranged to extend between the first monitoring unit and the second monitoring unit so as to allow bi-directional optical communication between the two monitoring units.

14. The apparatus of claim 1, comprising the optical fiber assembly, and wherein the optical fiber assembly comprises:

a first optical fiber arranged to carry the first digital optical signal past the disturbance to the first monitoring unit; and a second optical fiber arranged to carry the second digital optical signal past the disturbance to the second monitoring unit.

15. The apparatus of claim 1, wherein:

the first monitoring unit comprises a first optical transmitter, arranged to transmit the second digital optical signal from the first monitoring unit to the second monitoring unit; and the second monitoring unit comprises a second optical transmitter arranged to transmit the second digital optical signal from the first monitoring unit to the second monitoring unit.

16. The apparatus of claim 1, wherein the first monitoring unit and the second monitoring unit are arranged in separate housings and in different locations.

17. The apparatus of claim 1, wherein the first light detector comprises a first coherent receiver configured to measure the state of polarization of the first digital optical signal.

18. The apparatus of claim 1, wherein the first data comprises a first series of values representative of changes in the state of polarization of the first digital optical signal over time;

the second data comprises a second series of values representative of changes in the state of polarization of the second digital optical signal over time; and the processing system is configured to compare or cross-correlate the first data and the second data within a sliding time-window, when determining the position of the disturbance.

19. The apparatus of claim 1, wherein the first data comprises a first state-of-polarization signal that encodes a time derivative of the state of polarization for the first digital optical signal and the second data comprises a second state-of-polarization signal that encodes a time derivative of the state of polarization for the second digital optical signal, and wherein the apparatus is configured to process the first data and the second data to determine the position of the disturbance by:

cross-correlating the first state-of-polarization signal with the second state-of polarization signal and thereby determining a similarity measure representative of a degree of similarity between the change or a series of changes in the state of polarization of the first digital optical signal at or spanning the first time and the change or a series of changes in the state of polarization of the second digital optical signal at or spanning the second time;

determining whether the similarity measure exceeds a correlation threshold; and in response to determining that the similarity measure exceeds the correlation threshold, proceeding to determine or output the position of the disturbance.

20. A monitoring unit for use in a method of determining a position of a disturbance to an optical fiber assembly, the monitoring unit comprising a light detector, a clock, and state-of-polarization-measuring apparatus configured to measure a state of polarization of a digital optical signal received at the light detector, the monitoring unit being configured to:

receive a digital optical signal from an optical fiber assembly;

monitor a state of polarization of the digital optical signal received at the light detector; and determine, using the clock, data representative of a time at which a change occurs in the state of polarization of the digital optical signal received at the light detector, the change arising from a disturbance to the optical fiber assembly and the data being suitable for processing to determine a position of the disturbance, wherein the data encodes a time derivative of the state of polarization for the digital optical signal.

21. The monitoring unit of claim 20, further configured to send the data representative of a time at which a change occurs in the state of polarization to a remote processing system for processing to determine a position of the disturbance.

22. A method of determining a position of a disturbance to an optical fiber assembly that is optically coupled to a first monitoring unit and to a second monitoring unit, the method comprising:

receiving, at the first monitoring unit, a first digital optical signal carried by the optical fiber assembly;

monitoring a state of polarization of the first digital optical signal received at the first monitoring unit;

receiving, at the second monitoring unit, a second digital optical signal carried by the optical fiber assembly;

monitoring a state of polarization of the second digital optical signal received at the second monitoring unit;

determining, using a first clock, first data representative of a first time, being a time at which a change occurs in the state of polarization of the first digital optical signal received at the first monitoring unit, the change arising from a disturbance to the optical fiber assembly, wherein the first data encodes a time derivative of the state of polarization for the first digital optical signal;

determining, using a second clock, second data representative of a second time, being a time at which a change occurs in the state of polarization of the second digital optical signal received at the second monitoring unit, the change arising from the disturbance, wherein the second data encodes a time derivative of the state of polarization for the second digital optical signal; and processing the first data and the second data to determine a position of the disturbance.

23. An apparatus for determining a position of a disturbance to an optical fiber assembly, the apparatus comprising:

a first monitoring unit, comprising a first light detector, a first clock, and first state-of-polarization-measuring apparatus configured to measure a state of polarization of a digital optical signal received at the first light detector;

a second monitoring unit, comprising a second light detector, a second clock, and second state-of-polarization-measuring apparatus configured to measure a state of polarization of a digital optical signal received at the second light detector; and a processing system, wherein the apparatus is configured to:

transmit a series of one or more time-stamped synchronization packets, generated using a clock signal provided by the first clock, from the second monitoring unit to the first monitoring unit, embedded within a first digital optical signal;

receive, at the first monitoring unit, the first digital optical signal from an optical fiber assembly;

receive, at the second monitoring unit, a second digital optical signal from the optical fiber assembly;

use the series of one or more time-stamped synchronization packets to synchronize the first clock and the second clock;

monitor a state of polarization of the first digital optical signal received at the first light detector;

determine, using the first clock, first data representative of a first time, being a time at which a change occurs in the state of polarization of the first digital optical signal received at the first light detector, the change arising from a disturbance to the optical fiber assembly;

monitor a state of polarization of the second digital optical signal received at the second light detector;

determine, using the second clock, second data representative of a second time, being a time at which a change occurs in the state of polarization of the second digital optical signal received at the second light detector, the change arising from the disturbance; and process the first data and the second data to determine a position of the disturbance.

24. An apparatus for determining a position of a disturbance to an optical fiber assembly, the apparatus comprising:

a first monitoring unit, comprising a first light detector, a first clock, and first state-of-polarization-measuring apparatus configured to measure a state of polarization of a digital optical signal received at the first light detector;

a second monitoring unit, comprising a second light detector, a second clock, and second state-of-polarization-measuring apparatus configured to measure a state of polarization of a digital optical signal received at the second light detector; and a processing system, wherein the apparatus is configured to:

receive, at the first monitoring unit, a first digital optical signal from an optical fiber assembly;

receive, at the second monitoring unit, a second digital optical signal from the optical fiber assembly;

monitor a state of polarization of the first digital optical signal received at the first light detector;

determine, using the first clock, first data representative of a first time, being a time at which a change occurs in the state of polarization of the first digital optical signal received at the first light detector, the change arising from a disturbance to the optical fiber assembly;

monitor a state of polarization of the second digital optical signal received at the second light detector;

determine, using the second clock, second data representative of a second time, being a time at which a change occurs in the state of polarization of the second digital optical signal received at the second light detector, the change arising from the disturbance; and process the first data and the second data to determine a position of the disturbance, and wherein the apparatus is configured to monitor a further parameter of one or both of the first and second digital optical signals, received at the respective light detectors, in addition to monitoring the state of polarization, wherein the further parameter is amplitude, or phase, or signal-to-noise ratio, or bit error ratio, and wherein the apparatus is configured to process data representative of the further parameter, for one or both of the first and second digital optical signals, when determining the position of the disturbance.

* * * * *